E. C. BALLMAN.
METHOD AND APPARATUS FOR DETERMINING THE FIELD STRENGTH OF DYNAMO ELECTRIC MACHINES.
APPLICATION FILED APR. 3, 1916.
1,270,100.
Patented June 18, 1918.
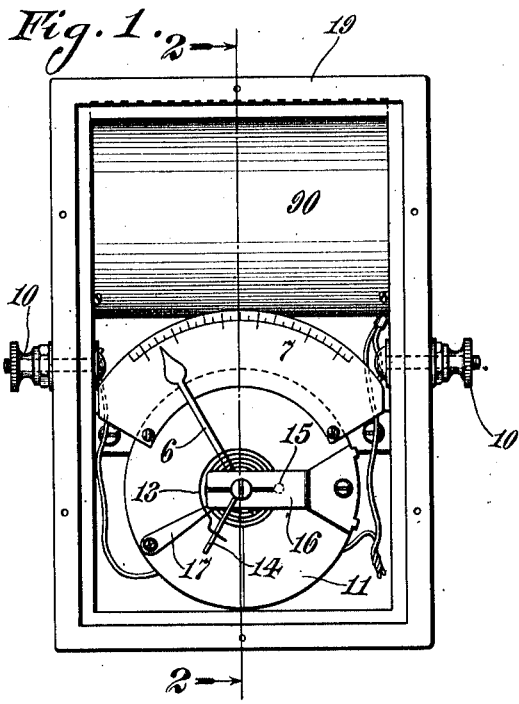
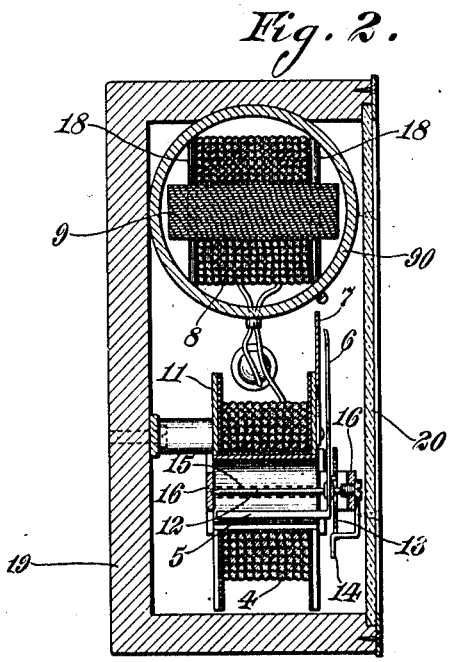
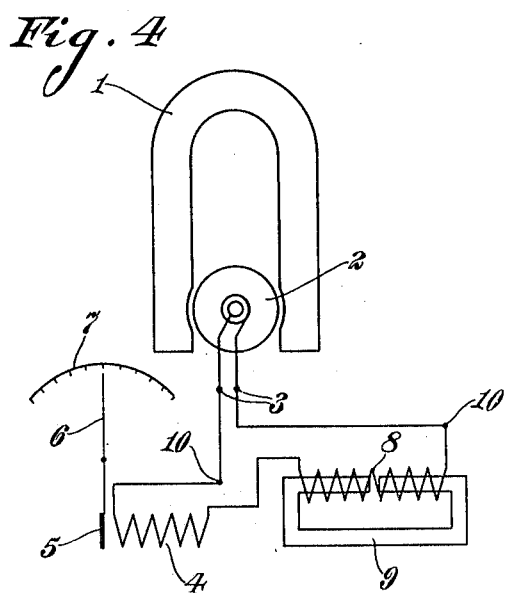
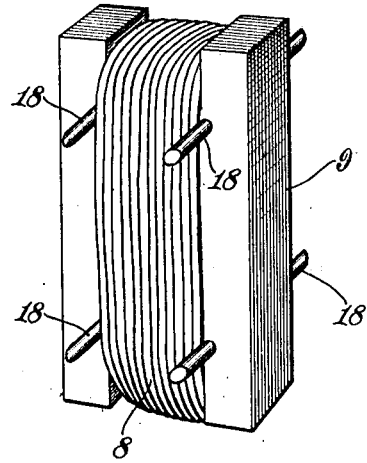
Inventor:
EDWIN C. BALLMAN,
By John H. Bruninga
His Attorney.

UNITED STATES PATENT OFFICE.

EDWIN C. BALLMAN, OF ST. LOUIS, MISSOURI, ASSIGNOR OF ONE-HALF TO STAHL A. WHITTEN, OF ST. LOUIS, MISSOURI.

METHOD AND APPARATUS FOR DETERMINING THE FIELD STRENGTH OF DYNAMO-ELECTRIC MACHINES.

1,270,100.     Specification of Letters Patent.     Patented June 18, 1918.

Application filed April 3, 1916. Serial No. 88,693.

*To all whom it may concern:*

Be it known that I, EDWIN C. BALLMAN, a citizen of the United States, and residing at St. Louis, in the State of Missouri, have invented a certain new and useful Improvement in Methods and Apparatus for Determining the Field Strength of Dynamo-Electric Machines, of which the following is a specification.

This invention relates to method and apparatus for determining the field strength of dynamo electric machines, and more particularly, method and apparatus for determining the strength and condition of the permanent magnets of a magneto.

As is well known, the so-called permanent magnets used in magnetos, lose their magnetism after use, with the result that the voltage of the magneto will drop so low that the magneto will not generate current of the proper voltage for the ignition or lighting system of an automobile. Frequently, also, wear in the bearings, and other causes, will give an irregular and fluctuating voltage, due, usually, to the varying air gap.

Heretofore it has been difficult to test magnetos, for the reason that, to do so, it was necessary to run the magneto at a predetermined constant speed, and then observe the reading of a voltmeter and compare the same with a test reading; this, however, requires the dismounting of the magneto from the automobile, and its operation by a constant speed prime mover. It will be obvious that this is a tedious and costly operation, more especially in machines where the magneto is built into the automobile.

Some of the objects of this invention, therefore, are to provide method and apparatus for determining the field strength and other conditions of a dynamo electric machine, such as a magneto, without necessitating the operation of such a machine at a predetermined constant speed, and without requiring the dismounting of such a machine from its place of installation.

Further objects will appear from the detail description taken in connection with the accompanying drawing, in which:

Figure 1 is a plan view of an apparatus embodying this invention, the cover being removed so as to show the interior parts;

Fig. 2 is a section on the line 2—2, Fig. 1;
Fig. 3 is a detail perspective view; and,
Fig. 4 is a diagram illustrating the method of operation.

As is well known, the current in any alternating current circuit is equal to the impressed electromotive force divided by the total impedance. This is usually expressed by the following formula:

$$C = \frac{E}{\sqrt{R^2 + X^2}}$$

If the resistance R is small as compared to the reactance X, then the current will practically be equal to the electromotive force divided by the reactance, or:

$$C = \frac{E}{X}.$$

Now the electromotive force is a function of the field strength and of the speed, and may, therefore, be represented by SMK, where S represents the speed, M the field strength, and K a constant. Furthermore, the reactance X, being a function of the frequency, is also a function of the speed, and may, therefore, be represented by SLk, where L represents the coefficient of self-inductance, and k another constant. The last equation can, therefore, be written as follows:

$$C = \frac{SMK}{SLk} = \frac{MK}{Lk}.$$

Now the coefficient of self-induction L is a function of the permeability of the magnetic circuit. Where the magnetic circuit is wholly a ferric circuit, the permeability, and thereof, L, of course, varies with the speed. If, however, the magnetic circuit is made up of ferric and non-ferric parts, and if the reluctance of the non-ferric part is a large part of the total reluctance, then L will be practically constant for all speeds, or at least for all speeds over a considerable range. Considering, therefore, that L is a constant, we can rewrite the last equation as follows:

$$C = M\frac{K}{Lk}.$$

Since the fraction is a constant, the current in such a circuit will vary only with the field strength, and the measure of the current is, therefore, a measure of the field strength, irrespective of the speed of the generator.

Referring now to Fig. 4, 1 designates the field magnet and 2 the armature of a magneto, the terminals of which are shown at 3. Connected in circuit with the magneto is a standard iron vane alternating current meter, or any other type of alternating current measuring means, the movable element of which has a deflection which is a function of the effective value of the current. In Fig. 4, 4 designates the field coil and 5 the iron vane of such an alternating current measuring means, this vane having a pointer 6 which moves over a suitable scale 7. Connected in series with the field coil 4 is a reactance coil 8, the iron core 9 of which has an air gap, as shown. The terminals of the instrument are indicated at 10.

In accordance with this invention, a field coil 4 of very low resistance is used, and the reactance coil 8 is also made of low resistance, so that the resistance of the circuit of the instrument will be very small compared with the reactance. The reactance device is also so proportioned that the non-ferric part of the magnetic circuit, or the air gap, will represent about ninety-five per cent. (95%) of the total reluctance. With an instrument designed as specified, the current traversing the circuit will be independent of the frequency, and, therefore, of the speed at which the magneto is run, and this current will, therefore, vary directly and solely with and will be a direct and sole function of the field strength of the machine. The instrument, when connected across the terminals of a magneto, will, therefore, indicate directly the strength of the magneto field.

In Figs. 1, 2 and 3 is shown a practical device embodying this invention, and similar parts have been indicated by the same reference characters as in Fig. 4. The field coil 4 of the current measuring means is wound on a brass spool 11, and the vane 5 is mounted on a pivot 12, which also carries the pointer 6 moving over the scale 7 attached to the spool. The pivot 12 is connected to one end of a spiral spring 13, the other end of which is connected to an arm 14 adjustably mounted on a bracket 16 on the spool. Passing through the spool is a soft iron bar or pin 15, which acts to repel the vane 5, and an adjusting device 17, in the form of a plate of soft iron, is mounted on the spool and adjustable about its pivoted end, so as to adjust the instrument. The current measuring means may of course be of any suitable construction.

Connected in series with the coil 4, and across the binding post 10, is the reactance coil 8, which is mounted on a laminated core 9, preferably of H-form, the coil so wound being mounted in a soft iron cylinder 90, the core being positioned in the cylinder by means of ebonite pins 18, so as to obtain the proper air gap. The reactance, as well as the current measuring means, is firmly mounted in a case 19, which has a glass cover 20. The scale 7 may be provided with any suitable graduations.

When the binding posts 10 are connected across the terminals of a magneto, and the magneto is run at a moderate speed, the pointer 6 will be positioned on the scale to a position depending upon the field strength of the magneto. By providing a table giving the proper field strengths of different makes of magnetos, or by placing these directly on the scale, the instrument will indicate at a glance whether the field strength has decreased sufficiently to require re-magnetization of the magnets. Since, as has been shown, the reading of the instrument is independent of the speed, the magneto can be tested directly on the automobile by simply running the engine and the magneto at a moderate speed. Since the instrument indicates directly the field strength of the magneto, variations and fluctuations in this strength due to irregular air gap, bad bearings, etc., are directly indicated. This instrument, therefore, furnishes a convenient means for readily testing magnetos and the like.

It is obvious that various changes may be made in the details of the method and apparatus without departing from the spirit of this invention, and it is, therefore, to be understood that this invention is not to be limited to the specific details described and shown.

Having thus described the invention, what is claimed is:

1. The method of determining the field strength of a dynamo-electric machine, comprising maintaining the value of the current delivered by the machine independent of its speed, and measuring the current delivered.

2. The method of determining the field strength of a dynamo-electric machine, comprising maintaining the value of the current delivered by the machine as a direct and sole function of the field strength, and measuring the current delivered.

3. The method of determining the field strength of a dynamo-electric machine, comprising varying the impedance of the circuit of the machine directly and solely in accordance with its speed, and measuring the current delivered by the machine.

4. The method of determining the field strength of a dynamo-electric machine, comprising connecting in circuit with the machine a reactance whose value is a direct and sole function of the speed, and measuring the current in the circuit.

5. The method of determining the field strength of a dynamo-electric machine, comprising connecting in circuit with the machine a reactance whose magnetic reluctance is substantially constant, and measuring the current in the circuit.

6. An apparatus for determining the field strength of dynamo-electric machines, comprising current measuring means adapted for connection in circuit with a dynamo-electric machine, and means for maintaining the value of the current as a direct and sole function of the field strength of the machine.

7. An apparatus for determining the field strength of dynamo-electric machines, comprising current measuring means adapted for connection in circuit with a dynamo-electric machine, and means for maintaining the value of the current independent of the speed of the machine.

8. An apparatus for determining the field strength of dynamo-electric machines, comprising current measuring means adapted for connection in circuit with a dynamo-electric machine, and means for varying the impedance of said circuit in accordance with the speed of the machine.

9. An apparatus for determining the field strength of dynamo-electric machines, comprising current measuring means, and means for maintaining the value of the current traversing said measuring means independent of its frequency.

10. An apparatus for determining the field strength of dynamo-electric machines, comprising current measuring means, and means for varying the impedance of the current measuring means circuit in accordance with the frequency of the current traversing said circuit.

11. An apparatus for determining the field strength of dynamo-electric machines, comprising current measuring means, and a reactance in circuit with said measuring means adapted to maintain the value of the current traversing said measuring means independent of its frequency.

12. An apparatus for determining the field strength of dynamo-electric machines, comprising current measuring means, and a reactance in circuit with said measuring means, said reactance being constructed so that its coefficient of reactance is substantially constant.

13. An apparatus for determining the field strength of dynamo-electric machines, comprising current measuring means, and a reactance in circuit with said measuring means, said reactance having a magnetic circuit whose reluctance remains substantially constant.

14. An apparatus for determining the field strength of dynamo-electric machines, comprising current measuring means, and a reactance in circuit with said measuring means, said reactance having a combination ferric and non-ferric magnetic circuit, the reluctance of the ferric part being relatively small with respect to the reluctance of the non-ferric part.

15. An apparatus for determining the field strength of dynamo-electric machines, comprising current measuring means, and a reactance in circuit with said measuring means, said reactance being constructed so that its coefficient of reactance is substantially constant, the resistance of said circuit being small compared to the reactance thereof.

In testimony whereof I affix my signature this 11th day of February, 1916.

EDWIN C. BALLMAN.